(No Model.) 2 Sheets—Sheet 2.
J. B. PRESTON.
LATHE.
No. 444,799. Patented Jan. 13, 1891.
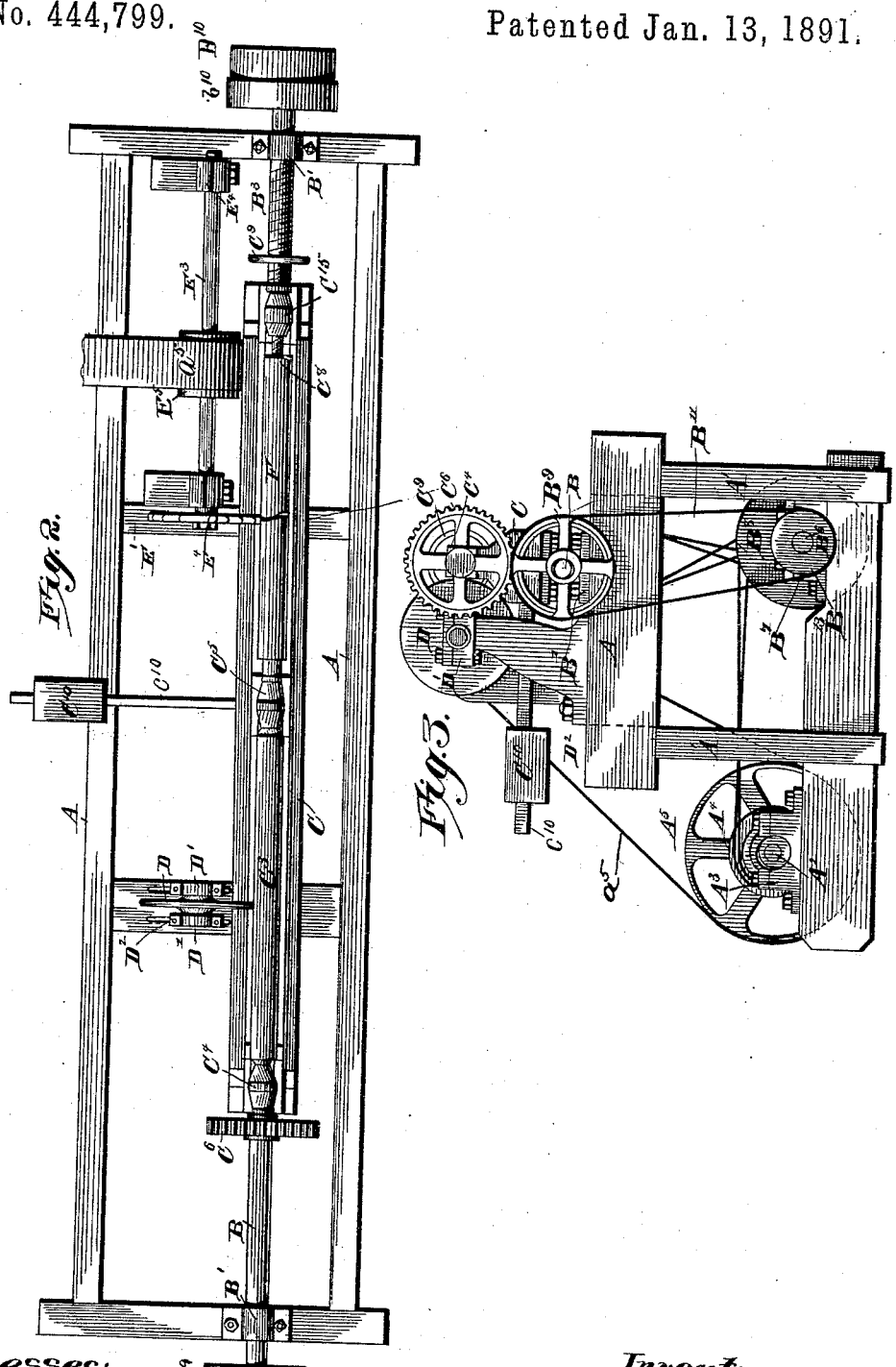
Witnesses:
Henry G. Dietrich
J. Thomson Cross
Inventor:
James B. Preston,
per
Attorney

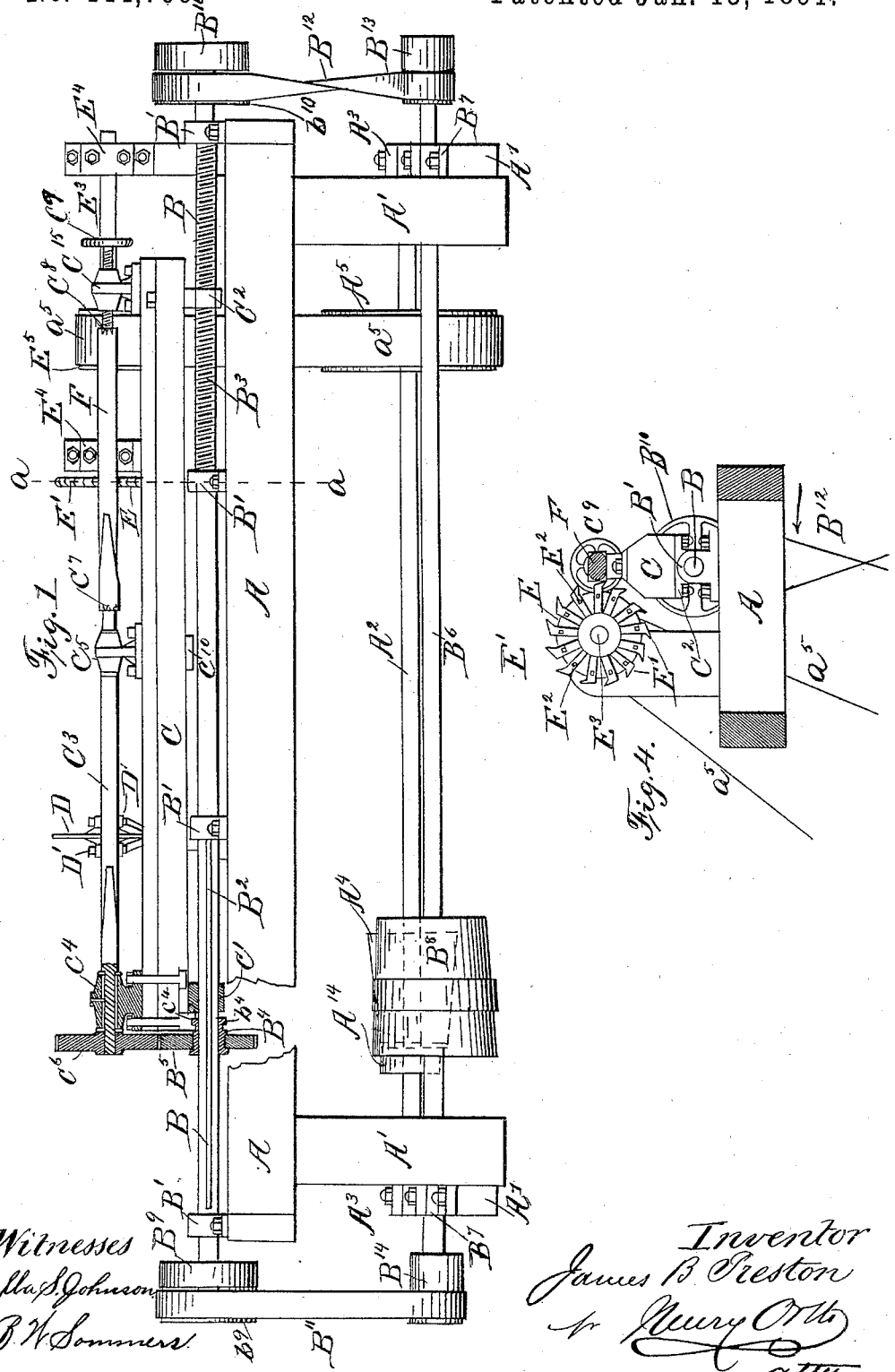

UNITED STATES PATENT OFFICE.

JAMES BROOKHOUSE PRESTON, OF DARLINGTON, ASSIGNOR OF ONE-HALF TO JOHN SANDROCOTTA MARSHALL AND FRANCIS COTTON, BOTH OF SYDNEY, NEW SOUTH WALES.

LATHE.

SPECIFICATION forming part of Letters Patent No. 444,799, dated January 13, 1891.

Application filed March 5, 1890. Serial No. 342,764. (No model.) Patented in New South Wales April 3, 1889, No. 1,337.

*To all whom it may concern:*

Be it known that I, JAMES BROOKHOUSE PRESTON, engineer, a subject of the Queen of Great Britain, residing at Darlington, near Sydney, in the British Colony of New South Wales, have invented certain new and useful Improvements in Turning-Lathes, (for which I have obtained Letters Patent in New South Wales, dated April 3, 1889, No. 1,337;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to that class of machines more especially designed for turning irregular forms, and commonly known as "copying-lathes," and has for its object to provide a cheap, effective, and economically-worked machine or lathe for turning irregular forms.

To these ends the invention consists in structural features and combinations of parts, as will now be fully described, reference being had to the accompanying drawings, in which—

Figure 1 is a side elevation. Fig. 2 is a top plan view. Fig. 3 is a left-hand end elevation, and Fig. 4 is a section taken on or about on line $a\ a$ of Fig. 1.

The operative mechanism of the machine is mounted upon a suitable frame-work A and A', the lower portion A' of which has bearings $A^3$ for the main driving-shaft $A^2$, that carries pulleys $A^4\ A^{14}$ and $A^5$, the pulley $A^{14}$ being belted to any suitable prime motor.

The pulley $A^5$ is connected by a belt $a^5$ with a pulley $E^5$ on the cutter-shaft $E^3$, which will presently be referred to, and the pulley $A^4$, which is a cone-pulley, as shown in dotted lines in Fig. 1 and full in lines in Fig. 3, is belted to a like pulley $B^8$ on a transmitting-shaft $B^6$, parallel with shaft $A^2$, said shaft $B^6$ having its bearings $B^7$ also in the lower portion A' of the framing A. The shaft $B^6$ carries at each end a belt-pulley $B^{14}\ B^{13}$, respectively. The belt-pulley $B^{14}$ is connected by a straight belt $B^{11}$ with the fast pulley $b^9$ of a pair, of which $B^9$ is the loose pulley, mounted on the left end of a screw-shaft B, which at its right end carries a like pair of pulleys $b^{10}\ B^{10}$, the fast pulley $b^{10}$ being shown as belted with the pulley $B^{13}$ on shaft $B^6$ by a crossed belt $B^{12}$. The shaft B has its bearings B' secured to the upper portion of the framing A and revolves freely in bearings C' $C^2$, depending from the under side of a carriage C, that has bearings $C^4$ and $C^5$ and the head-stock $C^{15}$, for purposes presently to be explained. At its left end the shaft B is provided with a key-groove $B^2$, into which takes a key or feather formed on a coupling-sleeve $B^4$, that is loosely mounted on the shaft B, and upon said sleeve is keyed a gear-wheel $B^5$, that meshes with a like wheel $C^6$, keyed to the pattern $C^3$. The flange $b^4$ of the sleeve $B^4$ is in perpetual engagement with a locking-groove $c^4$, formed in the under side of the carriage C, (see Fig. 1,) or in the enlarged head of one of the bolts or one of the straps that serve to secure the bearing $C^4$ to said carriage, thus locking the wheel $B^5$ to the carriage C, so that it will partake of its traversing motion. At its right-hand end the shaft B is screw-threaded, as shown at $B^3$, Figs. 1 and 2, and works in bearing $C^2$ of carriage C, which is interiorly screw-threaded and imparts to said carriage its traversing motion. It has been stated that the shaft B revolves freely in its bearings on the carriage, which is thus pivotally mounted on said shaft, and has an arm $c^{10}$, Fig. 2, on which is mounted a weight $C^{10}$, said arm projecting from the pattern-guide and cutter side of the carriage, so as to maintain the pattern in contact with said guide, and the material worked in contact with the cutter or tool.

From the description of the driving mechanism for the shaft B it will be readily understood that the traversing motion of the carriage C may be reversed whenever it reaches the limit of such motion in one direction.

The machine illustrated in the drawings is more especially designed for turning wheel-spokes, and I will describe the remaining parts accordingly, though it will be apparent to those conversant with this state of the arts that other irregular forms may be turned— such, for instance, as ax-helves, gunstocks, lasts, &c.—by providing suitable patterns and cutting-tools. The pattern C³ revolves freely in the bearings C⁴ C⁵ on carriage C, above referred to, and is provided with a suitable centering device C⁷, and at its opposite end carries the gear-wheel C⁶ that meshes with and is revolved by gear-wheel B⁵ on shaft B, hereinabove described, the wood— namely, the blank to be turned—being centered on the said pattern end and on an ordinary lathe center or centering-screw C⁸, adjustable in the head-stock C¹⁵. The pattern-guide D revolves freely with its shaft in bearings D', that are adjustable by means of bolts D², toward and from the pattern C³, and E is the cutter-disk, to which are adjustably secured a series of cutters E' by means of bolts E². The cutter-disk E is secured to a shaft E³, that has its bearings E⁴ in standards secured to the framing A, and said shaft carries the pulley E⁵ aforementioned belted to pulley A⁵ on shaft A².

In operation, motion being imparted to counter-shaft A², the counter-shaft B⁶ is caused to revolve by belt around pulleys A⁴ and B⁸, and the spindle E³ is likewise revolved by belt around pulleys A⁵ and E⁵. The wheel-spoke pattern C³ having been previously cast of metal, the wheel C⁶ is keyed onto its end, and it is passed through or laid in head-stocks C⁴ and C⁵, the blank F placed in its clutch or against its centering devices C⁷, and the hand-wheel C⁹ turned so that it is grasped in the centers. The belts B¹¹ and B¹² are so manipulated that one of them is, when required, placed over the fast pulley b⁹ or b¹⁰ of either of the pairs of fast and loose pulleys on shaft B, and so cause said shaft to revolve, giving similar motion through wheels B⁵ and C⁶ to the pattern and the blank. The threaded portion B³ of shaft B, revolving in the nut-bearing C², gives longitudinal motion to the carriage C and parts supported thereby, as well as to gear-wheel B⁵ on shaft B, as above explained. The gouges or cutters E' are retained in their sockets in the revolving holder or disk E by set-screws or bolts E², and they are adjusted according to the adjustment of the guide D relatively to the pattern C³. As the tools E' revolve and the bed C travels longitudinally backward and forward the blank F takes the form of the pattern C³, for the weight C¹⁰ tends to keep the bed inclined over, so that the pattern C³ always has a hard but elastic pressure on the guide D.

Having thus described my invention, what I claim is—

1. In a lathe for turning irregular forms, the combination, with the pattern provided at one end with a centering device, a gear-wheel rigidly secured to the opposite end of said pattern, and a head-stock provided with a centering-screw in the same straight line as the centering device on the pattern, of a revoluble shaft with which said parts are pivotally connected and on which they have endwise motion, and a gear-wheel adapted to revolve with the shaft and to have endwise motion thereon with the pattern, said gear-wheel being in perpetual gear with the like wheel on the pattern, for the purpose set forth.

2. In a lathe for turning irregular forms, the combination, with the pattern provided at one end with a centering device, a gear-wheel rigidly secured to the pattern at its opposite end, and a head-stock provided with a centering-screw in the same straight line as the centering device on the pattern, of a revoluble shaft with which said parts are pivotally connected and on which they have endwise motion, a gear-wheel adapted to revolve with the shaft and to have endwise motion thereon with the pattern, said gear-wheel being in perpetual gear with the like wheel on said pattern, a pattern-guide having a fixed position relatively to the pattern, and a weight arranged to exert power on the pattern and head-stock and tilt the same toward the pattern-guide, for the purpose set forth.

3. In a lathe for turning irregular forms, the combination of the shaft B, screw-threaded at one end and provided with a longitudinal key-groove at the opposite end, the coupling-sleeve B⁴, having annular flange b⁴, and the gear-wheel B⁵ on said sleeve, with the carriage C, provided with a groove c⁴ for the reception of flange b⁴ on coupling-sleeve B⁴, the bearings C' C² at opposite ends of the carriage, said bearing C² being screw-threaded interiorly, the pattern C³, revoluble in bearings on the carriage, the wheel C⁶ on said pattern and in gear with wheel B⁵ on shaft B, and the head-stock C¹⁵, secured to said carriage and having its lathe center in the horizontal axial plane of the like center on one end of the pattern, substantially as and for the purposes set forth.

4. In a lathe for turning irregular forms, the combination of the shaft B, screw-threaded at one end and provided with a longitudinal key-groove at the opposite end, the coupling-sleeve B⁴, having annular flange b⁴, the gear-wheel B⁵ on said sleeve, a revoluble pattern-guide, and a revoluble cutter-disk E, carrying cutters E', arranged on the one side of shaft B, with the carriage C, provided with a groove c⁴ for the reception of flange b⁴ on coupling-sleeve B⁴, the bearings C' C² at opposite ends of the carriage, said bearing C² being screw-threaded interiorly, the pattern C³, revoluble in bearings on the carriage, the gear-wheel C⁶ on said pattern and in gear with wheel B⁵ on shaft B, and the head-stock C¹⁵, secured to said carriage and having its lathe center in the horizontal axial plane of the like center on one end of the pattern, and a weighted arm c¹⁰, secured to the carriage on the side of said guide and cutter-disk, substantially as and for the purposes set forth.

5. In a lathe for turning irregular forms, the combination, with the shaft B, the gear-wheel B⁵ thereon and a pair of fast and loose pulleys at each end thereof, the carriage C, the pattern $C^3$, the gear-wheel $C^6$ on said pattern in gear with the wheel $B^5$ on shaft B, and the shaft $E^3$, carrying a pulley $E^5$, of the transmitting-shaft $B^6$, its belt-pulleys $B^{13}$ $B^{14}$, belted by crossed and straight belts with pulleys on shaft B, the main driving-shaft $A^2$, and the pulleys $A^4$ $A^5$ thereon, belted, respectively, with pulley $E^5$ on cutter-shaft $E^3$ and with pulley $B^8$ on transmitting-shaft $B^6$, substantially as and for the purposes set forth.

JAMES BROOKHOUSE PRESTON.

Witnesses:
FRED WALSH,
    *F. M. Inst. P. A.*
THOMAS J. WARD.